United States Patent
Fremy et al.

(10) Patent No.: US 10,794,489 B2
(45) Date of Patent: Oct. 6, 2020

(54) ANNULAR SEALS

(71) Applicant: SAINT-GOBAIN PERFORMANCE PLASTICS CORPORATION, Solon, OH (US)

(72) Inventors: Flavien Fremy, Brookline, MA (US); Rojendra Singh, Rockville, MD (US); Charles Deleuze, Westborough, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 109 days.

(21) Appl. No.: 15/780,011

(22) PCT Filed: Nov. 30, 2016

(86) PCT No.: PCT/US2016/064219
§ 371 (c)(1),
(2) Date: May 30, 2018

(87) PCT Pub. No.: WO2017/095926
PCT Pub. Date: Jun. 8, 2017

(65) Prior Publication Data
US 2019/0309852 A1  Oct. 10, 2019

Related U.S. Application Data

(60) Provisional application No. 62/261,504, filed on Dec. 1, 2015.

(51) Int. Cl.
*F16J 15/32* (2016.01)
*F16J 15/3204* (2016.01)
(Continued)

(52) U.S. Cl.
CPC ......... *F16J 15/3204* (2013.01); *F16J 15/024* (2013.01); *F16J 15/328* (2013.01);
(Continued)

(58) Field of Classification Search
CPC .... F16J 15/024; F16J 15/3204; F16J 15/3224; F16J 15/3228; F16J 15/328; F16J 15/3284
See application file for complete search history.

(56) References Cited

U.S. PATENT DOCUMENTS 605,891 A * 6/1898 Merwarth ............... F16L 23/22
277/609
2,259,940 A  10/1941 Nathan
(Continued)

FOREIGN PATENT DOCUMENTS

JP  2014109263 A  6/2014
WO  2017095926 A1  6/2017

OTHER PUBLICATIONS

Bertoldi et al., "Negative Poisson's Ratio Behavior Induced by an Elastic Instability," Advanced Materials, 2009, 6 pages, vol. 21.
(Continued)

*Primary Examiner* — Gilbert Y Lee
(74) *Attorney, Agent, or Firm* — Abel Schillinger, LLP; Chi Suk Kim

(57) ABSTRACT

An annular seal including a body defining a central lumen and a weakened portion disposed around the central lumen. In an embodiment, the weakened portion includes at least one aperture or a plurality of apertures. In a further embodiment, the apertures may be identical to one another. An annular seal including a body defining a central lumen bounded by a sidewall, wherein the body has a dual-elastic modulus profile including a first elastic modulus, $S_1$, as measured along the sidewall prior to assembly with an inner (Continued)

component, and a second elastic modulus, $S_2$, as measured along the sidewall after assembly with the inner component, and wherein the first elastic modulus is less than the second elastic modulus.

19 Claims, 7 Drawing Sheets

(51) Int. Cl.
*F16J 15/3224* (2016.01)
*F16J 15/328* (2016.01)
*F16J 15/3284* (2016.01)
*F16J 15/3228* (2016.01)
*F16J 15/02* (2006.01)

(52) U.S. Cl.
CPC ....... *F16J 15/3224* (2013.01); *F16J 15/3228* (2013.01); *F16J 15/3284* (2013.01)

(56) References Cited

U.S. PATENT DOCUMENTS

| | | | |
|---|---|---|---|
| 2,871,031 A | 1/1959 | Altemus et al. | |
| 3,129,964 A | 4/1964 | McNeil | |
| 4,240,643 A | 12/1980 | Becker et al. | |
| 5,362,115 A * | 11/1994 | Carr | F16L 23/16 277/608 |
| 5,909,880 A | 6/1999 | Waskiewicz | |
| 6,869,081 B1 * | 3/2005 | Jenco | F16L 23/003 277/611 |
| 6,948,717 B1 * | 9/2005 | Carr | F16L 23/167 277/609 |
| 7,258,347 B2 | 8/2007 | Keefe et al. | |
| 7,926,814 B2 | 4/2011 | Foti | |
| 8,016,549 B2 | 9/2011 | Shah et al. | |
| 2007/0273103 A1 | 11/2007 | Meier | |
| 2013/0045064 A1 | 2/2013 | MacHesky | |
| 2015/0016988 A1 | 1/2015 | Griffin | |
| 2015/0133593 A1 | 5/2015 | Kissell et al. | |

OTHER PUBLICATIONS

Shim et al., "Buckling induced encapsulation of structured elastic shells under pressure," Proc. Natl. Acad. Sci. U.S.A., 2012, 11 pages, vol. 109.

International Search Report and Written Opinion for PCT/US2016/064219, dated Mar. 7, 2017, 14 pages.

* cited by examiner

ANNULAR SEALS

CROSS-REFERENCE TO RELATED APPLICATIONS

This application is the National Stage of International Application No. PCT/US2016/064219, entitled "ANNULAR SEALS", by Flavien FREMY et al., filed Nov. 30, 2016, which claims priority to U.S. Patent Application No. 62/186,160, entitled "ANNULAR SEALS", by Flavien FREMY et al., filed Dec. 1, 2015, of which both applications are assigned to the current assignee hereof and incorporated herein by reference in their entireties.

TECHNICAL FIELD

The present disclosure relates to seals, and more particularly to seals having weakened portions.

BACKGROUND ART

Seals may be used in reciprocating and rotating assemblies to prevent fluid leakage. In certain instances, a seal may be disposed around a shaft to isolate fluid, debris, or pressure from reaching a sealed location. These seals are generally known as annular seals because of their annular shape. Annular seals may undergo high loading characteristics while tasked with maintaining effective sealing characteristic. Industries utilizing such annular seals continue to demand improved seals which are capable of handling high stress and loading over a long operational lifetime.

BRIEF DESCRIPTION OF THE DRAWINGS

Embodiments are illustrated by way of example and are not limited in the accompanying figures.

Figure 1:
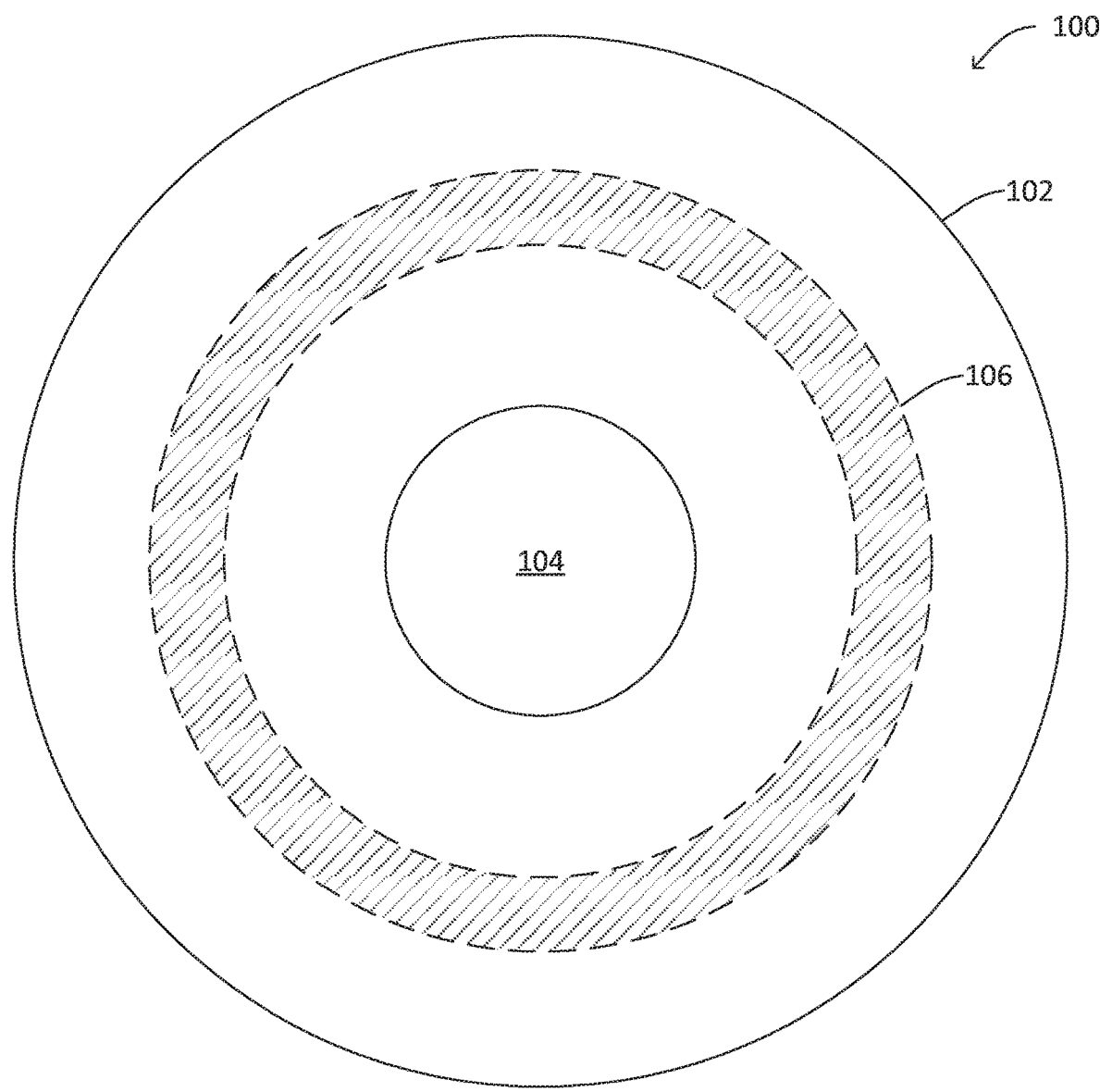
FIG. 1 includes a top view of an uninstalled annular seal in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENTS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The subject matter discussed in the related art section should not be assumed to be prior art merely as a result of its mention in the related art section. Similarly, a problem mentioned in the related art section or associated with the subject matter of the related art section should not be assumed to have been previously recognized in the prior art. The subject matter in the related art section merely represents different approaches, which in and of themselves may also be inventions.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "substantially" refers to a deviation of less than about 5% of the value as described in the whole state, such as less than about 4% of the value as described in the whole state, or even less than about 2% of the value as described in the whole state. For example, the phrase "substantially devoid" may refer to a characteristic that is at least about 95% devoid, such as at least about 96% devoid, or even at least 98% devoid of that characteristic.

As used herein, all standards are to be construed as the standard in place as of the time of the effective date. Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

An annular seal in accordance with one or more of the embodiments described herein may generally include a body defining a central lumen. The body may further include a weakened portion disposed adjacent, or around, the central lumen. In a particular instance, the weakened portion may at least partially, such as fully, collapse or otherwise deform upon an initial loading condition, e.g., during installation, such that the annular seal has a dual-elastic modulus profile. In such a manner, the annular seal may simultaneously permit ease of installation while providing a strong sealing characteristic after installation. That is, a sidewall of the body defining the central lumen may more readily deform prior to installation than after installation when tasked with providing an effective sealing characteristic. To the contrary, traditional seals typically include a single elastic modulus profile whereby high operational elastic modulus associated with effective sealing requires a high initial, pre-installation elastic modulus, thus making installation more challenging. Additionally, because such traditional seals are under high installation stress, they are more prone to failure during prolonged use as they operate under high internal loading and stress.

Referring initially to FIG. 1, in accordance with one or more of the embodiments described herein, an annular seal 100 can generally include a body 102 defining a central lumen ("lumen") 104 and a weakened portion 106. In an embodiment, the body 102 may include a substantially homogenous, such as a homogenous, composition including single-material compositions or blends. The body 102 can define axial ends and an axial length, $L_B$, therebetween. In an embodiment, the axial length, $L_B$, of the body 102 may remain relatively unchanged during installation between inner and outer components. For example, the body 102 may have an unassembled axial length, $L_U$, and an assembled axial length, $L_A$, where $L_A$ is no greater than 1.05 $L_U$, no greater than 1.04 $L_U$, no greater than 1.03 $L_U$, no greater than 1.02 $L_U$, no greater than 1.01 $L_U$, or no greater than 1.005 $L_U$. In a further embodiment, $L_A$ is no less than 0.95 $L_U$, no less than 0.96 $L_U$, no less than 0.97 $L_U$, no less than 0.98 $L_U$, or no less than 0.99 $L_U$.

In an embodiment, the weakened portion 106 may extend around the entire circumference of the lumen 104. Complete circumscription of the lumen 104 may occur with circumferential breaks in the weakened portion 106 as long as said breaks are uniform, or substantially uniform, such that a distinct weakened portion 106 where collapse may occur is discernible around the entire circumference of the lumen 104. In another embodiment, the weakened portion 106 may extend around only a portion of the lumen 104. For example, the weakened portion 106 may extend continuously around no greater than 95% of the circumference of the lumen 104, no greater than 75% of the circumference of the lumen 104, or no greater than 50% of the circumference of the lumen 104.

Figure 2:
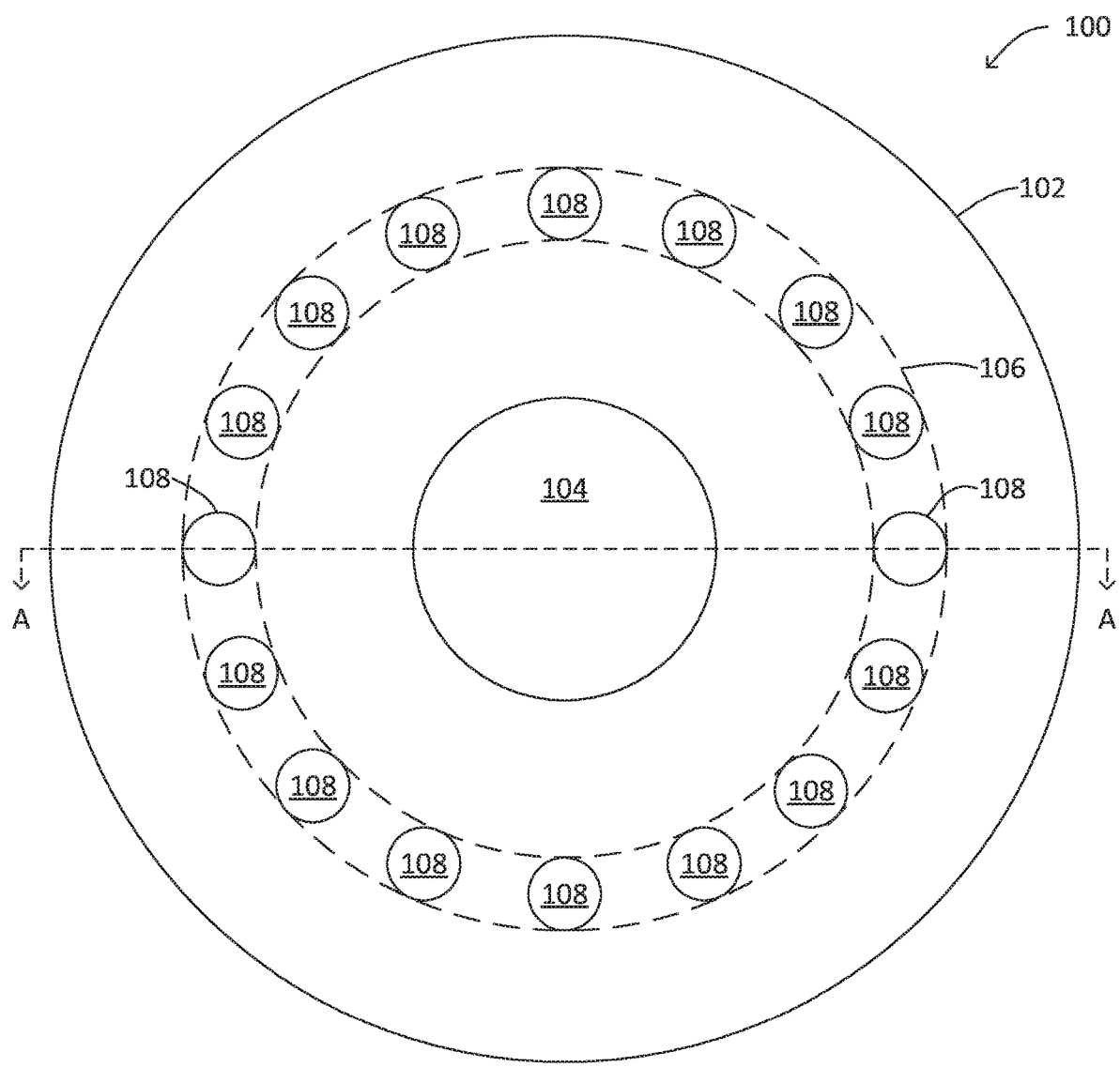
FIG. 2 includes a top view of an uninstalled annular seal in accordance with an embodiment.

Referring to FIG. 2, in an embodiment, the weakened portion 106 may include an aperture 108 extending into the body 102. In a more particular embodiment, the weakened portion 106 can include a plurality of apertures 108, such as at least two apertures, at least three apertures, at least four apertures, at least five apertures, at least ten apertures, at least twenty apertures, or at least fifty apertures. In another particular embodiment, the weakened portion 106 can include no greater than 1,000 apertures, no greater than 500 apertures, or no greater than 100 apertures. At least two of the plurality of apertures 108 may be identical, or share one or more similar attributes, with respect to one another. For example, at least two of the apertures 108 can have a same diameter or a same depth, as measured from an axial end of the body 102. In a particular instance, all of the apertures 108 can be identical to one another. That is, the apertures 108 can all have the same attributes as one another (e.g., diameter, shape, depth, etc.). Annular seals 100 having apertures 108 with the same attributes (e.g., identical diameter, shape, depth, etc.) may provide more even sealing characteristics as measured around the circumference of the seal in the installed state as compared to an annular seal 100 having apertures 108 with different attributes.

At least one of the apertures 108 may have a cross-sectional shape, as viewed from a top view, selected from an ellipsoid, an oval, a circle, a peanut shape, a polygon, a triangle, a quadrilateral, a rectangle, a square, a pentagon, a hexagon, a heptagon, an octagon, an enneogon, a decagon, a hendecagon, a dodecagon, a tridecagon, a tetradecagon, or any combination thereof. In an embodiment, at least one of the apertures 108 may have a cross-sectional shape, as viewed from a top view, including linear portions, arcuate portions, or combinations thereof. As described above and in accordance with an embodiment, at least two of the apertures 108 can have different cross-sectional shapes. For example, a first aperture may be circular while a second aperture is polygonal. By way of a further example, the first and second apertures may be alternated around the circumference of the body 102 such that no circular aperture is adjacent to another circular aperture and no polygonal aperture is adjacent to another polygonal aperture. In accordance with an embodiment, at least two of the apertures 108 can have a same cross-sectional shape.

In an embodiment, the cross-sectional shape of at least one of the apertures 108 may be constant as measured along the length of the aperture 108. That is, the relative shape of the at least one aperture 108 may remain the same at all relative distances from the axial end of the body 102. In a particular embodiment, the size (e.g., diameter) of at least one of the apertures 108 may be constant as measured along the length of the aperture 108. In another embodiment, the size and shape of at least one of the apertures 108 may be constant as measured along the length of the aperture 108. Such configuration may be suitable for applications where even pressure along the entire sealing surface is required. In another embodiment, the aperture 108 can have a varying size or shape as measured along the length of the aperture 108. That is, the aperture 108 can have a first cross-sectional attribute (size or shape) at a first location and a second cross-sectional attribute at a second location, where the first and second cross-sectional attributes are different from one another. For example, the aperture 108 can have polygonal shape at a first location and a circular shape at a second location. Transition between cross-sectional shapes may occur in any suitable manner, including gradually, suddenly, or in a manner therebetween. By way of a further example, the aperture 108 may have a first diameter at a first location and a second diameter at a second location, where the first and second diameters are different from one another. Transition between the diameters at the first and second locations may occur in any suitable manner, including gradually, suddenly, or in a manner therebetween.

In a particular instance, the apertures 108 may be equally distributed around the lumen 104. For example, in an embodiment, a distance between adjacent apertures 108 can be equal, as measured between all adjacent apertures 108. This may provide substantially equal loading conditions around the circumference of the annular seal 100. In another instance, the apertures 108 may be spaced apart from one another at varying or unequal distances. For example, a distance, $D_1$, as measured between a first pair of apertures 108 and 108, may be different from a distance, $D_2$, as measured between a second pair of apertures 108 and 108. $D_1$ may be at least 1.01 $D_2$, at least 1.05 $D_2$, at least 1.1 $D_2$, at least 1.2 $D_2$, at least 1.3 $D_2$, at least 1.4 $D_2$, at least 1.5 $D_2$, or at least 2.0 $D_2$. To mitigate the loading effects of such uneven distribution, the apertures 108 may be grouped together into sets each including at least two apertures where the distance between adjacent apertures in the same set is less than the distance between adjacent apertures of adjacent sets. The apertures 108 may be grouped into sets of at least two, at least three, at least four, at least five, or at least ten. The spacing between apertures 108 of each set may vary or remain constant.

In an embodiment, the body 102 may further include additional weakened portions (not illustrated). The additional weakened portions may be disposed radially inside or outside of the weakened portion 106 and may further facilitate suitable radial collapse of the body 102 during installation. In an embodiment, the attributes (e.g., size, shape, depth) of the additional weakened portions may be similar to the weakened portion 106. In another embodiment, the attributes of the additional weakened portions may be different from the attributes of the weakened portion 106.

Figure 3:
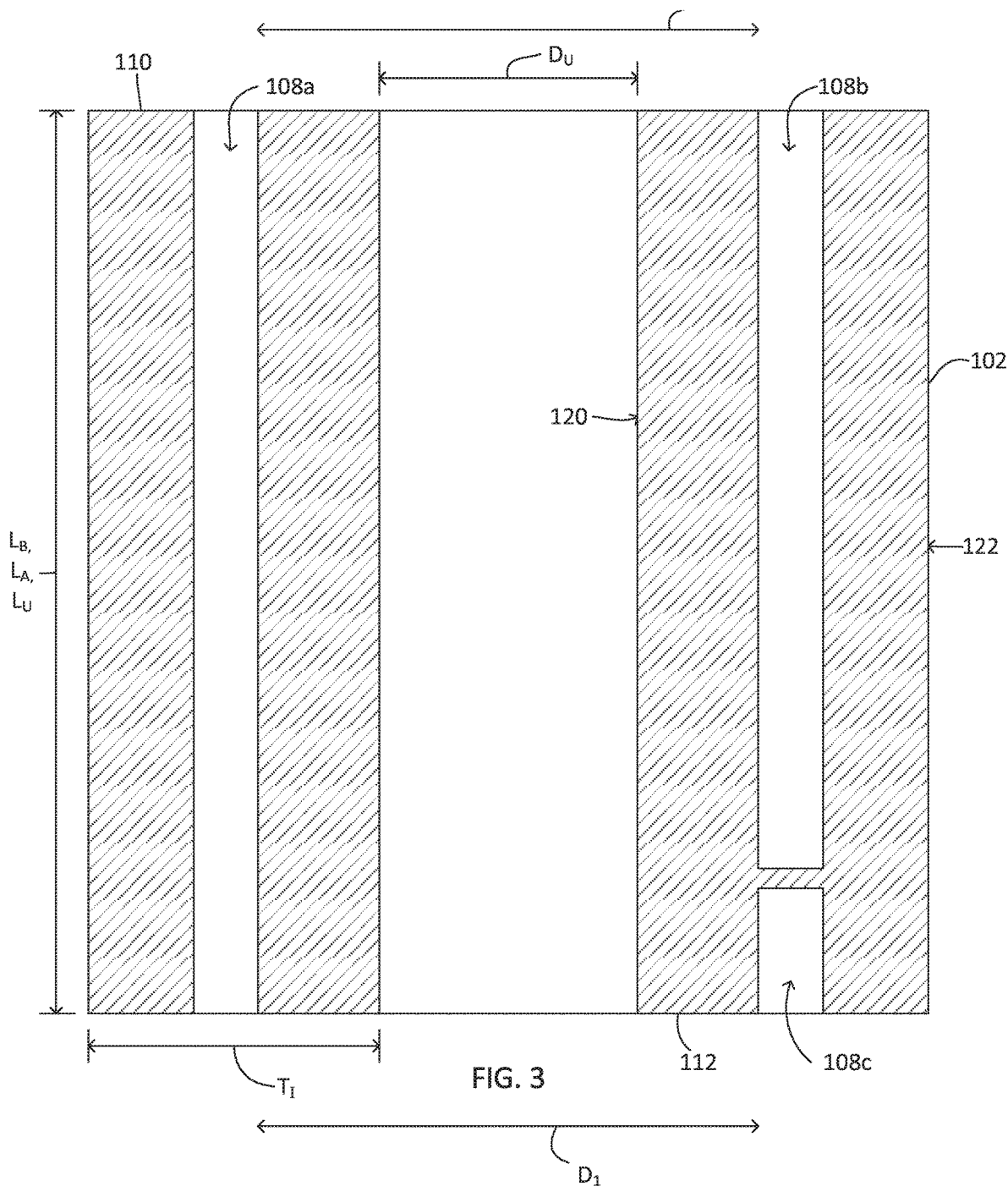
FIG. 3 includes a cross-sectional side elevation view of the uninstalled annular seal in accordance with an embodiment as seen along Line A-A in FIG. 2.

FIG. 3 illustrates a cross-sectional side elevation view of the annular seal 100 as seen prior to installation of an inner component within the lumen 104. As illustrated, the lumen 104 may have an initial uninstalled diameter, $D_U$, as measured at a location along the length of the lumen 104. As discussed above, the uninstalled diameter of the lumen, $D_U$, may be constant along the entire length of the lumen 104. The body 102 may have an initial wall thickness, $T_I$ as measured in a radial direction prior to installation of the inner component in the lumen 104, and an effective thickness, $T_E$, (FIG. 5) as measured in the radial direction after installation of the inner component in the lumen 104. In an embodiment, $T_I$ may be greater than $T_E$. For example, $T_I$ may be at least 1.01 $T_E$, at least 1.02 $T_E$, at least 1.03 $T_E$, at least 1.04 $T_E$, at least 1.05 $T_E$, at least 1.1 $T_E$, at least 1.2 $T_E$, at least 1.3 $T_E$, at least 1.4 $T_E$, at least 1.5 $T_E$, at least 2.0 $T_E$, at least 3.0 $T_E$, at least 4.0 $T_E$, or at least 5.0 $T_E$.

In accordance with an embodiment, at least one of the apertures 108a may extend through an entire axial length, $L_B$, of the body 102. In such a manner, the aperture 108a may be seen along either axial end 110 or 112 of the body 102.

In a further embodiment, at least one of the apertures 108b may extend through only a portion of the axial length of the body 102. For example, the at least one aperture 108b may extend through at least 25% of the axial length of the body, at least 50% of the axial length of the body, at least 75% of the axial length of the body, at least 90% of the axial length of the body, at least 95% of the axial length of the body, or at least 99% of the axial length of the body. The aperture 108b may not extend through 100% of the axial length of the body. In a particular instance, all of the apertures 108b extending less than the full axial length of the body 102 may extend from the same axial end 110 or 112. In another particular instance, some apertures 108b extending less than the full axial length of the body 102 may extend from axial end 110 while other apertures 108b may extend from axial end 112.

In a particular embodiment, a shadow aperture 108c may be positioned along the body 102 opposite the aperture 108b. The aperture 108b and shadow aperture 108c may both lie along a same, or substantially same, central axis. A distance between axially innermost surfaces of the aperture 108b and 108c may be as little as 0.1 mm, 0.5 mm, 1 mm, or 10 mm, and may allow for substantially even radial loading of the annular seal 100 while preventing leakage which might otherwise occur through an aperture 108a extending through the entire axial length of the body 102.

Figure 4:
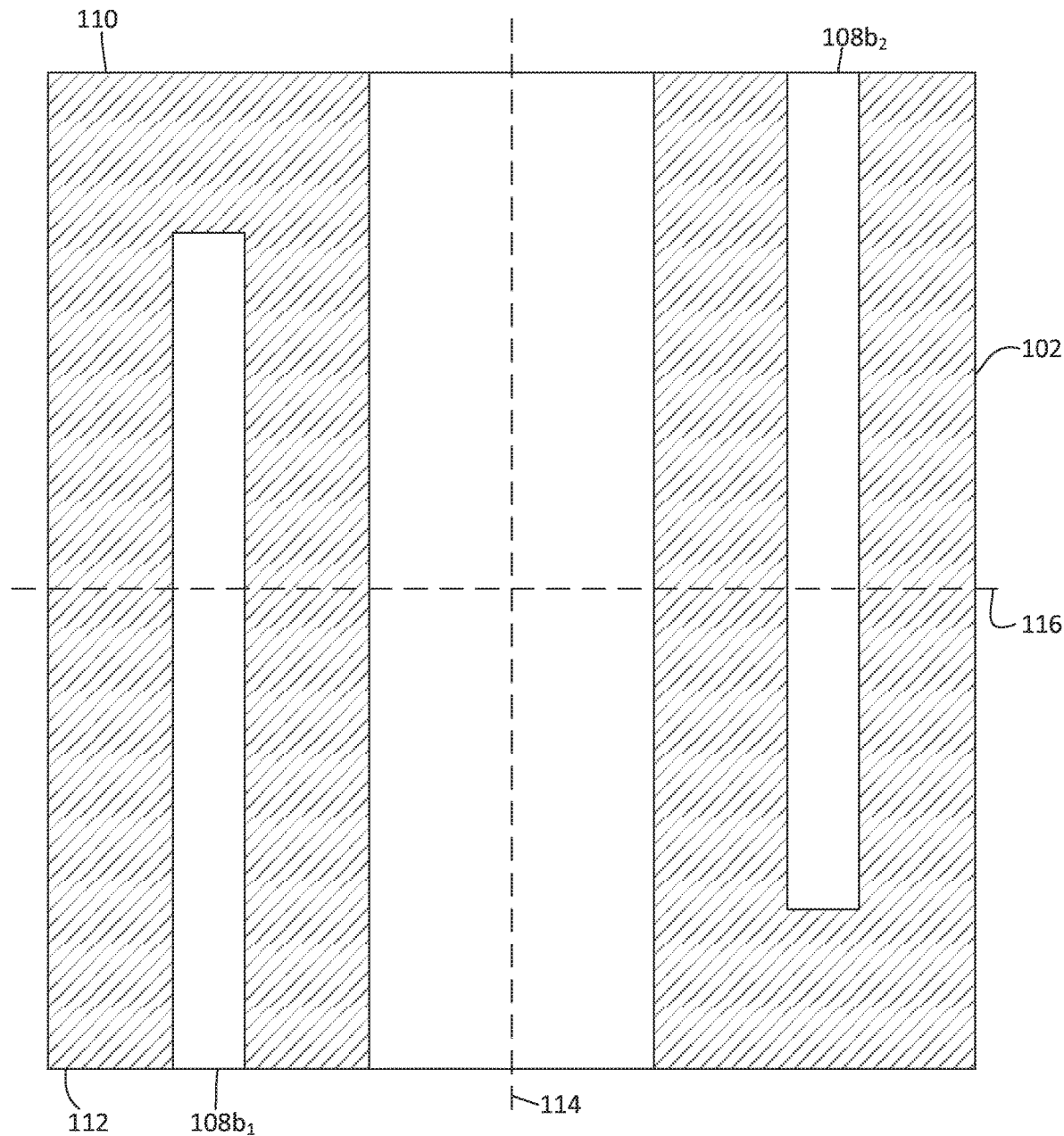
FIG. 4 includes a cross-sectional side elevation view of an uninstalled annular seal in accordance with an embodiment.

Referring to FIG. 4, in an embodiment, at least one of the apertures $108b_1$ extends from axial end 112 toward axial end 110 and at least one of the apertures $108b_2$ extends from axial end 112 toward axial end 110. In a particular embodiment, the apertures $108b_1$ and $108b_2$ may have the same relative depths, as measured from axial ends 112 and 110, respectively. In another particular embodiment, the apertures $108b_1$ and $108b_2$ may extend different depths from the axial ends 112 and 110, respectively. In a particular instance, the apertures $108b_1$ and $108b_2$ may radially overlap such that both apertures $108b_1$ and $108b_2$ intersect a line 116 perpendicular to a central axis 114 of the body 102. In another embodiment, the apertures $108b_1$ and $108b_2$ may not radially overlap. For example, by way of a non-limiting example, aperture $108b_1$ may extend 70% $L_B$ while aperture $108b_2$ extends 25% $L_B$. In such a manner, both apertures $108b_1$ and $108b_2$ do not intersect a line perpendicular to the central axis 114.

In an embodiment, the weakened portion 106 may include an aperture content defined as the ratio of aperture 108 area to body 102 area at a surface of the weakened portion 106. The aperture content may be at least 10%, at least 15%, at least 20%, at least 30%, at least 35%, at least 40%, at least 45%, at least 50%, at least 55%, at least 60%, at least 65%, at least 70%, at least 75%, at least 80%.

In an embodiment, at least one of the apertures 108 may have a diameter less than that of the lumen 104. In such a manner, the apertures 108 are less likely to be mistaken for the lumen 104 during installation. In another embodiment, all of the apertures 108 may have diameters less than the diameter of the lumen 104. In a further embodiment, at least one of the apertures 108 can have a diameter greater than that of the lumen 104. In yet another embodiment, all of the apertures 108 can have diameters greater than the diameter of the lumen 104.

Referring again to FIG. 3, in an embodiment, the apertures 108a and 108b may be radially spaced apart from the lumen 104 by a same distance. That is, the apertures 108a and 108b may be equidistantly spaced apart from the lumen 104. In another embodiment, all of the apertures 108 may be radially spaced apart from the lumen 104 by a same distance. In such a manner, the weakened portion of the body 102 may collapse uniformly during installation of an inner component within the lumen 104.

In a particular instance, the weakened portion (e.g., the apertures 108) may be equidistantly spaced apart from an inside sidewall 120 of the body 102 and an outside sidewall 122 of the body 102. That is, a distance from a central axis of the aperture 108 may be equidistant from both the inside and outside sidewalls 120 and 122. In other embodiments, the apertures 108 may be closer to the inside sidewall 120 than the outside sidewall 122 or closer to the outside sidewall 122 than the inside sidewall 120.

Figure 5:
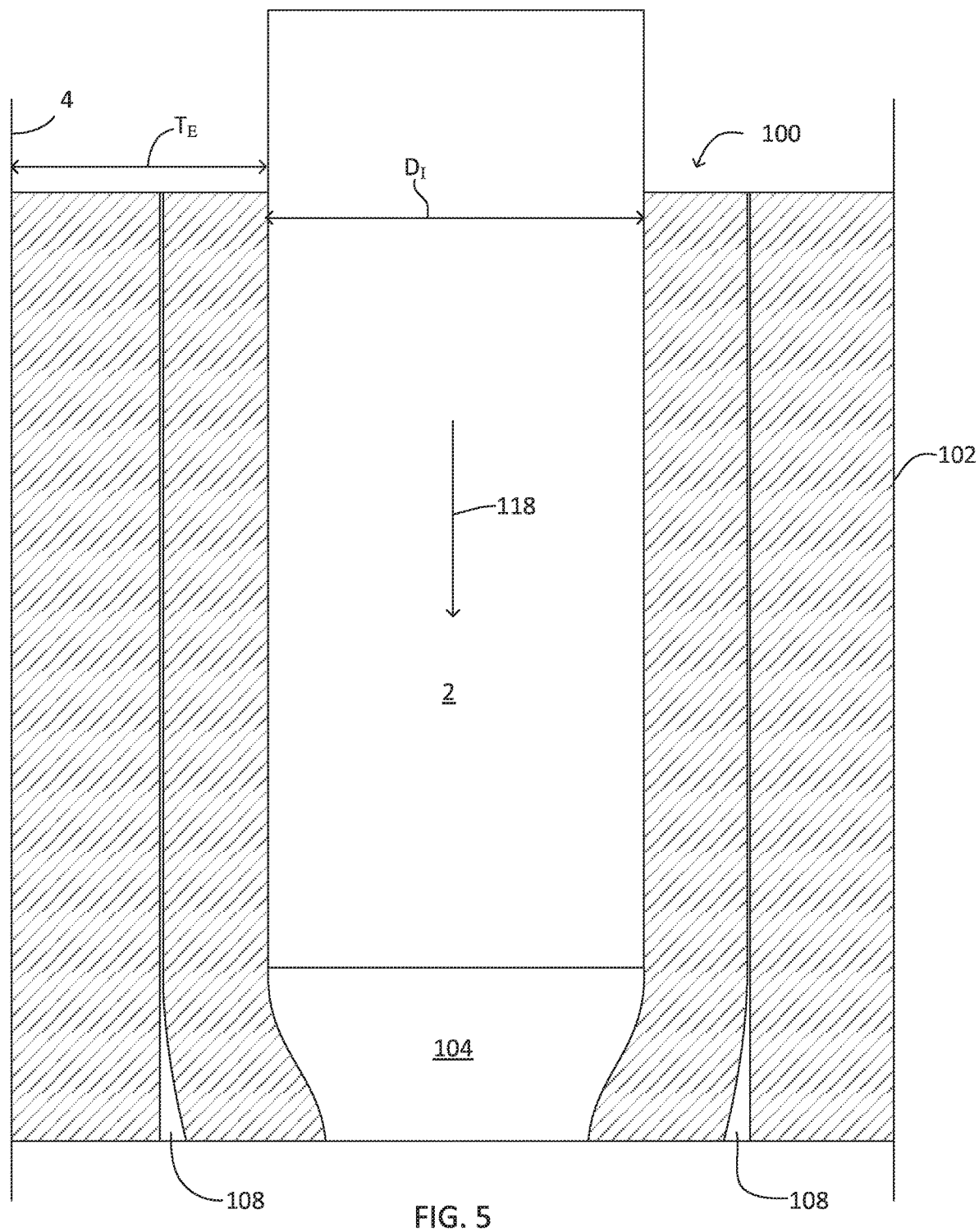
FIG. 5 includes a cross-sectional side elevation view of the annular seal during installation of an inner component in accordance with an embodiment.

FIG. 5 illustrates the annular seal 100 during installation of an inner component 2 (e.g., a shaft) into the lumen 104. As illustrated, the annular seal 100 includes apertures 108 having the same size and shape as one another. As the inner component 2 is urged into the lumen 104 in a direction as illustrated by line 118, the apertures 108 may collapse, permitting the lumen 104 to expand to accommodate the inner component 2. In this regard, the inner component 2 has a diameter that is greater than the diameter of the lumen 104 in the uninstalled state. As the inner component 2 is urged through the lumen 104, the body 102 may deflect, primarily in the weakened portion to accommodate the diameter of the inner component 2. In such a manner, the lumen 104 may have an installed diameter, $D_I$, as measured after installation of the inner component 2, that is greater than the uninstalled diameter, $D_U$ (FIG. 3). In an embodiment, $D_I$ may be at least 1.1 $D_U$, at least 1.2 $D_U$, at least 1.3 $D_U$, at least 1.4 $D_U$, at least 1.5 $D_U$, at least 1.6 $D_U$, at least 1.7 $D_U$, at least 1.8 $D_U$, at least 1.9 $D_U$, or at least 2.0 $D_U$. As $D_I$ increases relative to $D_U$, the relative size of the weakened portion 106 may be increased to prevent material compression of the body 102 in regions outside of the weakened portion 106. It is noted that in a particular embodiment, installation of the inner component 2 into the lumen 104 is performed after installation of the annular seal 100 into an outer component 4. However, it may also be possible to reverse installation by first installing the inner component 2 into the lumen 104 prior to installing the annular seal 100 into the outer component 4.

Figure 6:
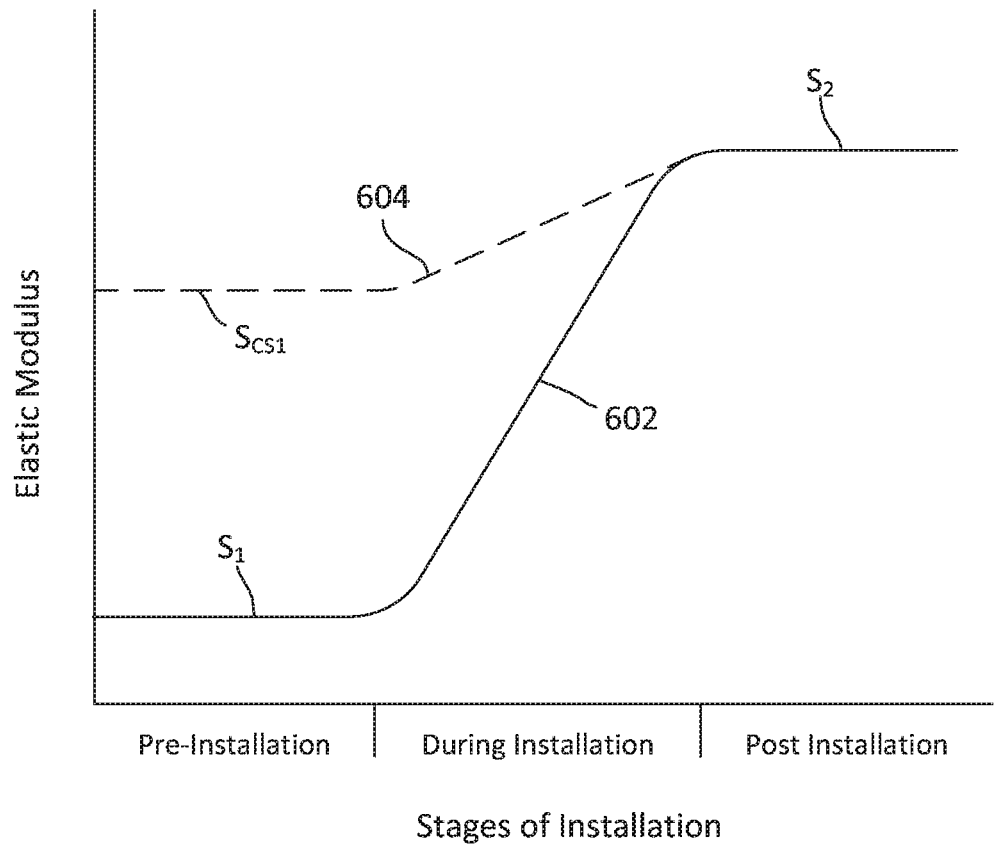
FIG. 6 includes a graph illustrating elastic modulus of a body of the annular seal as measured along the sidewall in accordance with an embodiment.

As illustrated in FIG. 6, a elastic modulus profile 602 of the body 102 of an annular seal 100 in accordance with an embodiment described herein and as measured along the inner sidewall 120 (FIG. 3) changes during installation 604, from a first elastic modulus, $S_1$, as measured prior to installation of the inner component 2, to a second elastic modulus, $S_2$, as measured after installation of the inner component 2. The second elastic modulus, $S_2$, may be greater than the first elastic modulus, $S_1$. For example, $S_2$ may be at least 1.01 $S_1$, at least 1.05 $S_1$, at least 1.1 $S_1$, at least 1.2 $S_1$, at least 1.3 $S_1$, at least 1.4 $S_1$, at least 1.5 $S_1$, at least 2.0 $S_1$, at least 3.0 $S_1$, at least 4.0 $S_1$, at least 5.0 $S_1$, at least 10.0 $S_1$, or at least 25.0 $S_1$. In an embodiment, $S_1$, is no greater than 75% $S_2$, no greater than 50% $S_2$, no greater than 25% $S_2$. In such a manner, the material force of the body 102 against an inner component along the inner surface increases as the lumen is expanded. Meanwhile, traditional seals devoid of weakened portions have a elastic modulus profile 604 with a higher pre-installation elastic modulus, as measured along an inner sidewall into which the inner component is receivable. That is, to achieve the same elastic modulus ($S_2$) and thus the same radial force in the assembled stage, the initial elastic modulus, $S_{CS1}$, of the traditional seal devoid of a weakened portion is higher. In certain embodiments, $S_{CS1}$ may be at least 1.1 $S_1$, at least 1.2 $S_1$, at least 1.3 $S_1$, at least 1.4 $S_1$, at least 1.5 $S_1$, at least 2.0 $S_1$, or even at least 5.0 $S_1$. In turn, installation of traditional seals having the same sealing characteristic is more difficult, requiring use of greater installation force, possibly the use of lubricants to facilitate sliding between the inner component and the seal, and resulting in possible cracking or marking along the sealing interface. Moreover, the traditional seal may exhibit higher internal stresses and strain, thereby reducing operational life expectancy.

The body 102 may have an uninstalled density, $d_U$, as measured within an annular region defined by a volume contained within the inner sidewall 120, the outer sidewall 122, the first axial end 110, and the second axial end 112, and an installed density, $d_A$, as measured within the annular region. In an embodiment, $d_A$ is greater than $d_U$. For example, $d_A$ may be at least 1.01 $d_U$, at least 1.05 $d_U$, at least 1.1 $d_U$, or at least 1.5 $d_U$. A body density change, indicating the state of compression of the body 102, may be defined by a difference between $d_A$ and $d_U$. The body 102 may further have a material density, $d_{MU}$, as measured in the uninstalled state, and $d_{MA}$, as measured in the installed state. Material density ($d_{MU}$ and $d_{MA}$) describes density of the material of the body 102 independent of apertures 108. As used herein, "material density" refers to the density of a material including porosity and naturally forming material defects such as gaps, air holes, impurities, and other similar defects which can reduce density of the material. A ratio $[d_A-d_U/d_{MA}-d_{MU}]$ of the body density change to a material density change may be greater than 1.0. For example, the ratio $[d_A-d_U/d_{MA}-d_{MU}]$ may be at least 1.01, at least 1.05, at least 1.1, at least 1.2, at least 1.3, at least 1.4, or at least 1.5. To the contrary, traditional annular seals typically have a ratio $[d_A-d_U/d_{MA}-d_{MU}]$ equal to 1.0. Thus, traditional annular seals typically have higher internal material stress as caused by a greater distribution of deformation to the body 102 which can reduce operable lifespan of the seal, particularly in hostile environments such as those environments with extreme temperatures, chemicals, pressures, or sizing differences.

Figure 7:
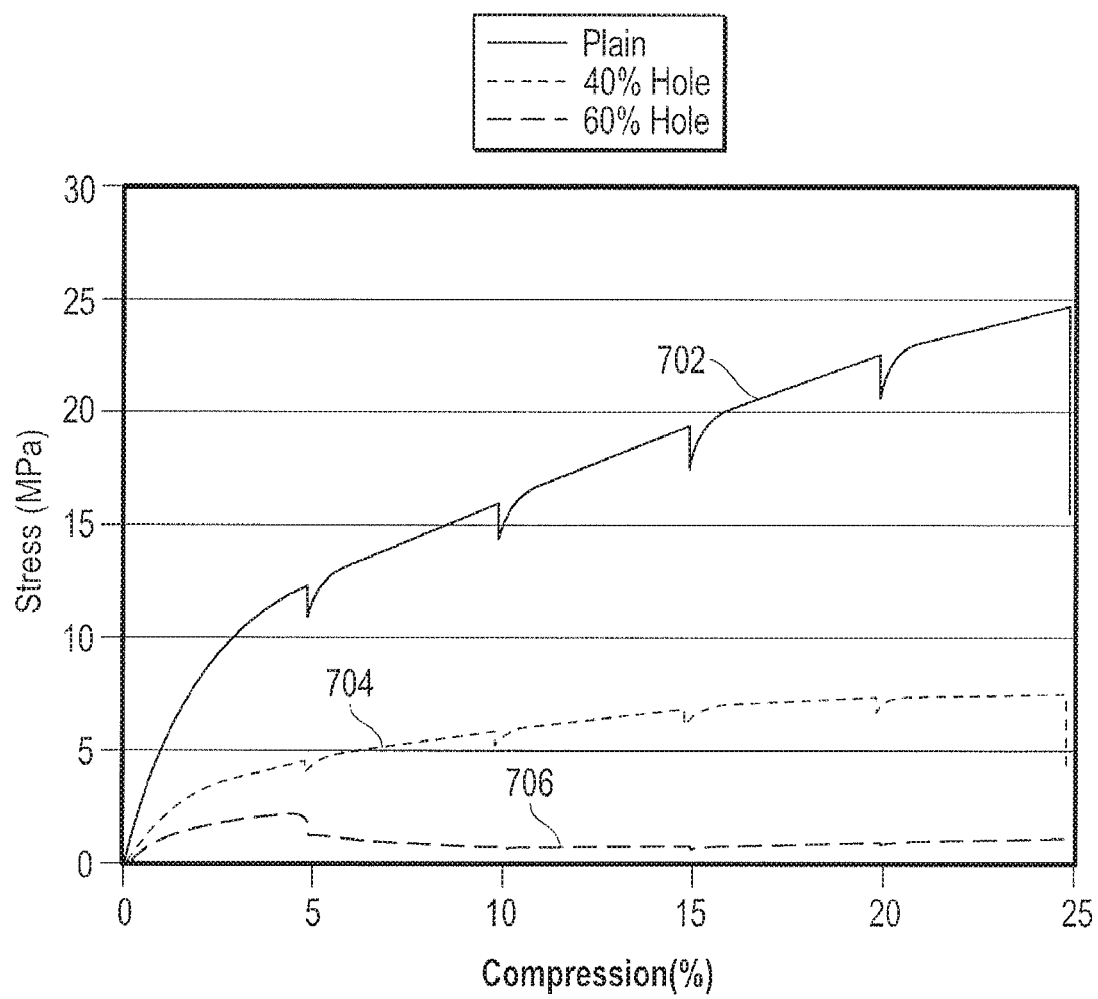
FIG. 7 includes a graph illustrating stress of a body of the annular seal as measured in relation to compression in accordance with an embodiment.

As illustrated in FIG. 7, a stress profile in MPa of the body 102 of an annular seal 100 in accordance with an embodiment described herein and as measured with respect to compression %. In an embodiment without a weakened portion 106 (e.g., the apertures 108) as shown in line 702, the stress increases drastically with respect to increased compression %. In an embodiment with a weakened portion 106 (e.g., the apertures 108) with a aperture content of 40% as shown in line 704, the stress increases slightly with respect to increased compression %. In an embodiment with a weakened portion 106 (e.g., the apertures 108) with a aperture content of 60% as shown in line 706, the stress increases slightly with respect to increased compression %, then remains steady or decreases over increased compression %. Thus, annular seals in accordance with the embodiments described herein may show decreased stress as compression increases in relation to aperture content.

Annular seals in accordance with embodiments described herein may be free of internally biasing elements, such as springs, while providing a high effective sealing force against inner and outer components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. An annular seal comprising:
 a body defining a central lumen and a weakened portion disposed around the central lumen.

Embodiment 2. An annular seal comprising:
 a body defining a central lumen bounded by a sidewall, wherein the body has a dual-elastic modulus profile including a first elastic modulus, $S_1$, as measured along the sidewall prior to assembly with an inner component, and a second elastic modulus, $S_2$, as measured along the sidewall after assembly with the inner component, and wherein $S_1$ is no greater than 75% $S_2$, no greater than 50% $S_2$, no greater than 25% $S_2$.

Embodiment 3. An annular seal comprising a body defining a central lumen having an uninstalled diameter, $D_U$, as measured prior to assembly of an inner component, and an installed diameter, $D_I$, as measured after assembly of the inner component, and wherein $D_I$ is at least 1.1 $D_U$, at least 1.2 $D_U$, at least 1.3 $D_U$, at least 1.4 $D_U$, at least 1.5 $D_U$, or at least 2.0 $D_U$.

Embodiment 4. A seal assembly comprising:
 an outer component defining a bore;
 an inner component disposed within the bore; and
 an annular seal disposed between the inner and outer components, wherein the annular seal comprises:
  a body defining a central lumen,
  wherein:
   the inner component is disposed within the central lumen, and
   sealing force against the inner component is provided in part by deflection of a weakened portion in the body.

Embodiment 5. A method of installing an annular seal between an inner component and an outer component comprising:
providing an annular seal having a body defining a central lumen and a weakened portion disposed around the central lumen;
installing the annular seal in the outer component; and
inserting the inner component into the central lumen.

Embodiment 6. The method of embodiment 5, wherein installing the annular seal in the outer component is performed prior to inserting the inner component into the central lumen.

Embodiment 7. The method of any one of embodiments 5 and 6, wherein inserting the inner component into the central lumen is performed such that the weakened portion in the annular seal at least partially deflects.

Embodiment 8. The annular seal, seal assembly, or method of any one of the preceding embodiments, wherein the weakened portion comprises an aperture, wherein the weakened portion comprises a plurality of apertures, wherein at least two of the apertures are identical, wherein all of the apertures are identical.

Embodiment 9. The annular seal, seal assembly, or method of any one of the preceding embodiments, wherein the weakened portion comprises an aperture extending through the body, wherein the aperture is generally parallel with the central lumen, wherein the aperture is parallel with the central lumen, wherein the aperture is disposed around the central lumen.

Embodiment 10. The annular seal, seal assembly, or method of any one of the preceding embodiments, wherein the weakened portion comprises a plurality of apertures extending through the body, wherein at least one of the apertures has a diameter less than a diameter of the central lumen, wherein all of the apertures have diameters less than the diameter of the central lumen, wherein at least two apertures have a same diameter, wherein all apertures have a same diameter, wherein at least two apertures are radially spaced apart from the central lumen by a same distance, wherein all apertures are radially spaced apart from the central lumen by a same distance.

Embodiment 11. The annular seal, seal assembly, or method of any one of the preceding embodiments, wherein the weakened portion is adapted to at least partially collapse upon installation of an inner component within the central lumen, wherein the weakened portion is adapted to fully collapse upon installation of the inner component within the central lumen.

Embodiment 12. The annular seal, seal assembly, or method of any one of the preceding embodiments, wherein the body has an unassembled axial length, $L_U$, and an assembled axial length, $L_A$, and wherein $L_A$ is no greater than 1.05 $L_U$, no greater than 1.04 $L_U$, no greater than 1.03 $L_U$, no greater than 1.02 $L_U$, no greater than 1.01 $L_U$, or no greater than 1.005 $L_U$.

Embodiment 13. The annular seal, seal assembly, or method of any one of the preceding embodiments, wherein the central lumen has an uninstalled diameter, $D_U$, as measured prior to assembly of an inner component, and an installed diameter, $D_I$, as measured after assembly of the inner component, and wherein $D_I$ is at least 1.1 $D_U$, at least 1.2 $D_U$, at least 1.3 $D_U$, at least 1.4 $D_U$, at least 1.5 $D_U$, or at least 2.0 $D_U$.

Embodiment 14. The annular seal, seal assembly, or method of any one of the preceding embodiments, wherein the body comprises a substantially homogenous composition, wherein the body comprises a homogenous composition.

Embodiment 15. The annular seal, seal assembly, or method of any one of the preceding embodiments, wherein the weakened portion comprises an aperture, wherein the aperture extends through at least 25% of an axial length of the body, at least 50% of the axial length of the body, at least 75% of the axial length of the body, at least 90% of the axial length of the body, at least 95% of the axial length of the body, or at least 99% of the axial length of the body, wherein the aperture extends through the entire axial length of the body, wherein the aperture extend through the entire axial length of the body.

Embodiment 16. The annular seal, seal assembly, or method of any one of the preceding embodiments, wherein at least one of the weakened portions comprises an aperture, wherein the aperture has a cross-sectional shape selected from a circle, an oval, a peanut shape, a polygon, a triangle, a rectangle, a square, a pentagon, a hexagon, a heptagon, an octagon, an enneagon, a decagon, a hendecagon, a dodecagon, a tridecagon, a tetradecagon, or any combination thereof, wherein the cross-sectional shape of the aperture includes linear portions, arcuate portions, or a combination thereof.

Embodiment 17. The annular seal, seal assembly, or method of any one of the preceding embodiments, wherein the weakened portion comprises an aperture, wherein the cross-sectional profile of the aperture is uniform along the axial length of the body, wherein the cross-sectional profile of the aperture varies along the axial length of the body, wherein the cross-sectional profile of the aperture at a first location of the body is different than the cross-sectional profile of the aperture at a second location of the body.

Embodiment 18. The annular seal, seal assembly, or method of any one of the preceding embodiments, wherein the body has a dual-elastic modulus profile including a first elastic modulus, $S_1$, as measured along the sidewall prior to assembly with an inner component, and a second elastic modulus, $S_2$, as measured along the sidewall after assembly with the inner component, and wherein the first elastic modulus is less than the second elastic modulus.

Embodiment 19. The annular seal, seal assembly, or method of embodiment 18, wherein $S_2$ is at least 1.01 $S_1$, at least 1.05 $S_1$, at least 1.1 $S_1$, at least 1.2 $S_1$, at least 1.3 $S_1$, at least 1.4 $S_1$, at least 1.5 $S_1$, at least 2.0 $S_1$, at least 3.0 $S_1$, at least 4.0 $S_1$, at least 5.0 $S_1$, at least 10.0 $S_1$, or at least 25.0 $S_1$.

Embodiment 20. The annular seal, seal assembly, or method of any one of the preceding embodiments, wherein the weakened portion comprises at least two apertures, at least three apertures, at least four apertures, at least five apertures, at least ten apertures, at least twenty apertures, or at least fifty apertures, wherein the apertures are evenly distributed around the central lumen, wherein the apertures are equally spaced apart from one another, wherein at least two of the apertures are identical, wherein all of the apertures are identical.

Embodiment 21. The annular seal, seal assembly, or method of any one of the preceding embodiments, wherein the seal has an initial wall thickness, $T_I$, as measured in a radial direction prior to assembly with an inner component, and an effective thickness, $T_E$, as measured in the radial direction after assembly with the inner component, and wherein $T_I$ is greater than $T_E$.

Embodiment 22. The annular seal, seal assembly, or method of embodiment 21, wherein $T_I$ is at least 1.01 $T_E$, at least 1.02 $T_E$, at least 1.03 $T_E$, at least 1.04 $T_E$, at least 1.05 $T_E$, at least 1.1 $T_E$, at least 1.2 $T_E$, at least 1.3 $T_E$, at least 1.4 $T_E$, at least 1.5 $T_E$, at least 2.0 $T_E$, at least 3.0 $T_E$, at least 4.0 $T_E$, or at least 5.0 $T_E$.

Embodiment 23. The annular seal, seal assembly, or method of any one of the preceding embodiments, wherein the weakened portion is spaced apart from both an inside sidewall and an outside sidewall of the body, wherein the weakened portion is equally spaced apart from the inside sidewall and the outside sidewall, wherein the weakened portion is closer to the inside sidewall than the outside sidewall, wherein the weakened portions is closer to the outside sidewall than the inside sidewall.

Embodiment 24. The annular seal, seal assembly, or method of any one of the preceding embodiments, wherein the body comprises an uninstalled density, $d_U$, as measured within an annular region defined by an inner sidewall of the body, an outer sidewall of the body, a first axial end of the body, and a second axial end of the body, and an assembled density, $d_A$, as measured within the annular region, and wherein $d_A$ is greater than $d_U$, wherein $d_A$ is at least 1.01 $d_U$, at least 1.05 $d_U$, at least 1.1 $d_U$, at least 1.5 $d_U$, or at least 2.0 $d_U$, wherein the body comprises a body density change, as measured by a difference between $d_A$ and $d_U$.

Embodiment 25. The annular seal, seal assembly, or method of embodiment 24, wherein the body comprises a material density change as measured by a difference between a material density, $d_{MU}$, as measured in the uninstalled state, and a material density, $d_{MA}$, as measured in the assembled state, and wherein a ratio $[d_A-d_U/d_{MA}-d_{MU}]$ of the body density change to the material density change is greater than 1, greater than 1.01, greater than 1.05, greater than 1.1, or greater than 1.5.

Note that not all of the features described above are required, that a portion of a specific features may not be required, and that one ore more features may be provided in addition to those described. Still further, the order in which features are described are not necessary the order in which they are installed.

Certain features are, for clarity, described herein n the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. An annular seal comprising:
a body defining a central lumen and a weakened portion disposed around the central lumen, wherein the body comprises an uninstalled density, $d_u$, as measured within an annular region defined by an inner sidewall of the body, an outer sidewall of the body, a first axial end of the body, and a second axial end of the body, and an assembled density, $d_A$, as measured within the annular region, and wherein $d_A$ is greater than $d_U$, wherein the body comprises first elastic modulus, $S_1$, as measured prior to installation, to a second elastic modulus $S_2$, as measured after installation, and wherein $S_2$ is at least 1.01 $S_1$.

2. The annular seal of claim 1, wherein the weakened portion comprises a plurality of apertures, wherein at least two of the apertures are identical.

3. The annular seal of claim 1, wherein the weakened portion comprises an aperture extending through the body, wherein the aperture is generally parallel with the central lumen.

4. The annular seal of claim 1, wherein the weakened portion comprises a plurality of apertures extending through the body, wherein at least one of the apertures has a diameter less than a diameter of the central lumen.

5. The annular seal of claim 1, wherein the weakened portion comprises an aperture that extends through at least 25% of an axial length of the body.

6. The annular seal of claim 1, wherein the weakened portion comprises an aperture, wherein the aperture has a cross-sectional shape selected from a circle, an oval, a peanut shape, a polygon, a triangle, a rectangle, a square, a pentagon, a hexagon, a heptagon, an octagon, an enneogon, a decagon, a hendecagon, a dodecagon, a tridecagon, a tetradecagon, or any combination thereof.

7. The annular seal of claim 1, wherein the body has an unassembled axial length, $L_u$, and an assembled axial length, $L_A$, and wherein $L_A$ is no greater than 1.05 L.

8. The annular seal of claim 1, wherein the body comprises a substantially homogenous composition.

9. The annular seal of claim 1, wherein the weakened portion comprises at least two apertures, wherein the apertures are evenly distributed around the central lumen.

10. The annular seal of claim 1, wherein the body comprises a material density change as measured by a difference between a material density, $d_{Mu}$, as measured in the uninstalled state, and a material density, $d_{MA}$, as measured in the assembled state, and wherein a ratio $[d_A-d_u/d_{MA}-d_{Mu}]$ of the body density change to the material density change is greater than 1.

11. A seal assembly comprising:
an outer component defining a bore;
an inner component disposed within the bore; and
an annular seal disposed between the inner and outer components, wherein the annular seal comprises:
a body defining a central lumen,
wherein:
the inner component is disposed within the central lumen, and
sealing force against the inner component is provided in part by deflection of a weakened portion in the body, wherein the body comprises an uninstalled density, $d_U$, as measured within an annular region defined by an inner sidewall of the body, an outer sidewall of the body, a first axial end of the body, and a second axial end of the body, and an assembled density, $d_A$, as measured within the annular region, and wherein $d_A$ is greater than $d_U$, wherein the body comprises a first elastic module, $S_1$, as measured prior to installation, to a second elastic modulus, $S_2$, as measured after installation, and wherein $S_2$ is at least 1.01 $S_1$.

12. The seal assembly of claim 11, wherein the weakened portion is adapted to at least partially collapse upon installation of an inner component within the central lumen.

13. The seal assembly of claim 11, wherein the central lumen has an uninstalled diameter, $D_U$, as measured prior to assembly of an inner component, and an installed diameter, $D_I$, as measured after assembly of the inner component, and wherein $D_I$ is at least 1.1 $D_U$.

14. The seal assembly of claim 11, wherein the body has a dual-stiffness profile including a first stiffness, $S_1$, as measured along the sidewall prior to assembly with an inner component, and a second stiffness, $S_2$, as measured along the sidewall after assembly with the inner component, and wherein the first stiffness is less than the second stiffness.

15. The seal assembly of claim 11, wherein the seal has an initial wall thickness, $T_I$, as measured in a radial direction prior to assembly with an inner component, and an effective thickness, $T_E$, as measured in the radial direction after assembly with the inner component, and wherein $T_I$ is greater than $T_E$.

16. The seal assembly of claim 11, wherein the weakened portion is spaced apart from both an inside sidewall and an outside sidewall of the body.

17. A method of installing an annular seal between an inner component and an outer component comprising:
providing an annular seal having a body defining a central lumen and a weakened portion disposed around the central lumen;
installing the annular seal in the outer component; and
inserting the inner component into the central lumen, wherein the body comprises an uninstalled density, $d_U$, as measured within an annular region defined by an inner sidewall of the body, an outer sidewall of the body, a first axial end of the body, and a second axial end of the body, and an assembled density, $d_A$, as measured within the annular region, and wherein $d_A$ is greater than $d_U$, wherein the body comprises a first elastic modulus, $S_1$, as measured prior to installation, to a second elastic modulus, $S_2$, as measured after installation, and wherein $S_2$ is at least 1.01 $S_1$.

18. The method of claim 17, wherein installing the annular seal in the outer component is performed prior to inserting the inner component into the central lumen.

19. The method of claim 17, wherein inserting the inner component into the central lumen is performed such that the weakened portion in the annular seal at least partially deflects.

* * * * *

UNITED STATES PATENT AND TRADEMARK OFFICE
CERTIFICATE OF CORRECTION

PATENT NO. : 10,794,489 B2
APPLICATION NO. : 15/780011
DATED : October 6, 2020
INVENTOR(S) : Flavien Fremy et al.

Page 1 of 1

It is certified that error appears in the above-identified patent and that said Letters Patent is hereby corrected as shown below:

In the Claims

Column 12, Line 10, Claim 1: please delete "$d_u$", and insert --$d_U$--

Column 12, Line 16, Claim 1: please insert --a-- between "comprises" and "first elastic"

Column 12, Line 43, Claim 7: please delete "1.05 L", and insert --1.05 $L_U$--

Column 13, Line 6, Claim 11: please delete "$d^U$", and insert --$d_U$--

Column 13, Line 7, Claim 11: please delete "module", and insert --modulus--

Column 14, Line 11, Claim 17: please delete "$d_u$", and insert --$d_U$--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*